United States Patent
Suzue et al.

(10) Patent No.: US 6,306,796 B1
(45) Date of Patent: Oct. 23, 2001

(54) PHOTOCATALYST, PROCESS FOR PRODUCING THE SAME AND MULTIFUNCTIONAL MEMBERS

(75) Inventors: Masayoshi Suzue; Minoru Aki, both of Tokushima; Katsura Torii, Osaka, all of (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/341,143

(22) PCT Filed: Mar. 31, 1998

(86) PCT No.: PCT/JP98/01476

§ 371 Date: Jul. 15, 1999

§ 102(e) Date: Jul. 15, 1999

(87) PCT Pub. No.: WO98/43733

PCT Pub. Date: Oct. 8, 1998

(30) Foreign Application Priority Data

Apr. 1, 1997 (JP) .................................................... 9-099692

(51) Int. Cl.[7] .......................... B01J 23/00; C01G 23/047; C09C 1/36; C04B 35/46; C04B 35/48
(52) U.S. Cl. .......................... 502/350; 423/610; 106/436; 501/134
(58) Field of Search .......................... 502/350; 423/610; 106/436; 501/134

(56) References Cited

U.S. PATENT DOCUMENTS

| | | | | |
|---|---|---|---|---|
| 4,652,439 | * | 3/1987 | Nishiuchi et al. | 423/598 |
| 4,944,936 | * | 7/1990 | Lawhorne | 423/612 |
| 5,120,701 | * | 6/1992 | Brand et al. | 502/350 |
| 5,173,386 | * | 12/1992 | Murasawa | 430/84 |
| 5,484,757 | * | 1/1996 | Szymanski et al. | 502/350 |
| 5,718,878 | * | 2/1998 | Zhang | 423/701 |
| 5,897,958 | * | 4/1999 | Yamada et al. | 446/474 |
| 5,942,205 | * | 8/1999 | Murata et al. | 423/598 |
| 5,981,425 | * | 11/1999 | Taoda et al. | 502/350 |
| 6,013,238 | * | 1/2000 | Murata et al. | 423/598 |

FOREIGN PATENT DOCUMENTS 0 737 513    10/1996  (WO) .

OTHER PUBLICATIONS

English abstract of JP–A–06–157,200—Haruyama et al Jun. 1994.
English abstract of JP–A–06–183,737—Suzue et al Jul. 1994.
English abstract of JP–A–04–305,018—Sasaki et al Oct. 1992.
English abstract of JP–A–07–000,819—Takaoka et al Jun. 1995.
English abstract of JP–A–08–131,524—Hayakawa et al May 1996.

* cited by examiner

Primary Examiner—Mark L. Bell
Assistant Examiner—Patricia L. Hailey
(74) Attorney, Agent, or Firm—Arent Fox Kintner Plotkin & Kahn, PLLC

(57) ABSTRACT

A titanium dioxide photocatalyst having a monoclinic crystal structure is prepared by subjecting a titanium dioxide hydrate fiber to a heat treatment at a temperature of 80 to 350° C., and then further heat treatment at a temperature of 360 to 650° C., and a multifunctional material is obtained by use of the photocatalyst.

6 Claims, 1 Drawing Sheet

PHOTOCATALYST, PROCESS FOR PRODUCING THE SAME AND MULTIFUNCTIONAL MEMBERS

TECHNICAL FIELD

The invention relates to a titanium dioxide photocatalyst, a process thereof, and a multifunctional material.

BACKGROUND ART

Pollution by malodor, deleterious materials in the air, etc. has become a problem in recent years. Also, water pollution by domestic waste water, industrial waste water, etc. has spread widely. Thus, environmental pollution has become a serious social problem.

In removing malodor or deleterious materials, absorption process using acid or alkali, and adsorption process using an adsorbent have been employed conventionally. In these processes, however, it is necessary to treat a waste liquid or spent adsorber. On the other hand, it is known that when a semiconductor device is irradiated with light, electrons having strong reducing action and holes having strong oxidizing action are formed and the molecular species after having been in contact with the semiconductor device are decomposed by oxidation-reduction action. Such a photocatalytic action of the semiconductor is applicable to decomposition and removal of deleterious materials.

JP-B-9850/1990 discloses to decompose deleterious materials in waste by using a photocatalyst such as titanium oxide. JP-B-78326/1992 discloses to eliminate toilet night soil odor, tobacco odor, etc. by using a photocatalyst such as titanium oxide.

In addition, a number of titanium oxide photocatalysts are disclosed in JP-A-199524/1994, 205974/1994, 279026/1994, 819/1995, 241475/1995, 275704/1995, 303835/1995, 99041/1996, 81222/1996, 126845/1996, and 182934/1996.

JP-A-131834/1996 discloses a titanium oxide sol for photocatalyst and a multifunctional material having photocatalytic action.

The above conventional titanium oxide photocatalysts are, however, ones which employ titanium oxide, e.g., anatase-type titanium oxide, rutile-type titanium oxide, brookite-type titanium oxide, amorphous titanium oxide, metatitanic acid and orthotitanic acid, titanium hydroxide, or hydrate titanium oxide. It has been therefore demanded a novel photocatalyst having superior activity and a multifunctional material using the same.

Accordingly, it is an object of the invention to provide a novel photocatalyst having superior activity, a process thereof, and a multifunctional material using the same.

DISCLOSURE OF THE INVENTION

The present invention provides a titanium dioxide photocatalyst having a monoclinic crystal structure, a process thereof, and a multifunctional material using the same.

The titanium dioxide of a photocatalyst of the invention is characterized in that its crystal structure is monoclinic and its lattice constant is expressed by: a=12.163 Å, b=3.735 Å, c=6.513 Å, $\alpha=\gamma=90°$, and $\beta=107.29°$. This monoclinic titanium dioxide differs from the known anatase-type, rutile-type, or brookite-type titanium dioxide in crystal structure. The single crystal of the monoclinic titanium dioxide of the invention is normally of a size from 0.005 μm to 0.1 μm, preferably from about 0.007 μm to 0.05 μm. The monoclinic titanium dioxide may be of a polycrystal which is the assembly of single crystals.

A monoclinic titanium dioxide of the invention is obtained by subjecting a titanium dioxide hydrate fiber to a heat treatment at a temperature in the range of 80 to 350° C. and then further heat treatment at a temperature in the range of 360 to 650° C. Titanium dioxide hydrate as a starting material is not specifically limited. This is obtained in a manner well known in the art, for example, a method in which alkali metal titanate is treated with water, warm water, inorganic acid, organic acid, or a mixture of at least two of them, to remove the alkali metal content. A monoclinic 8-titanic acid is obtained by subjecting titanium dioxide hydrate to heat treatment at a specific temperature range of usually 80 to 350° C., preferably 110 to 200° C. Below 80° C., the composition of 8-titanic acid cannot be obtained. Above 350° C., there is a possibility that the shape of a monoclinic 8-titanic acid is impaired. No specific limitations are imposed on heating time, however, it is usually two or more hours, preferably from about 3 to 50 hours, more preferably from about 10 to 30 hours. After heating, it may be allowed to cool. No specific limitations are imposed on cooling, and any known manner can be employed, e.g., air cooling, mechanical cooling, or in a combination of these.

Subsequently, the above monoclinic 8-titanic acid is subjected to heat treatment at a temperature of 360 to 650° C., preferably 500 to 650° C., to obtain a monoclinic titanium dioxide of the invention. When a heating temperature is less than 360° C., crystallization does not proceed sufficiently to give a substance of low crystallinity, failing to obtain the desired compound of the invention. On the other hand, when it exceeds 650° C., anatase-type or rutile-type titanium dioxide is formed and thus fails to obtain the present compound.

A monoclinic titanium dioxide of the invention may be in any forms, for example, in the form of particle, fiber, whisker or bar. For particulate form, its suitable size is generally in the range of 0.005 to 50 μm, preferably about 0.01 to 10 μm. For fibrous or whisker form, its suitable fiber diameter is in the range of 0.05 to 2 μm, preferably 0.1 to 1 μm, and its suitable fiber length is usually in the range of 0.5 to 30 μm, preferably about 1 to 20 μm, although it is possible to obtain ones having about hundreds of μm.

A monoclinic titanium dioxide of the invention has a specific surface area of about 1 to 500 m²/g, preferably about 3 to 300 m²/g, more preferably about 5 to 200 m²/g. Even when the monoclinic titanium dioxide has a small specific surface area, it has a great photocatalytic activity and thus exhibits an extremely large activity per unit specific surface area.

In applying a photocatalyst of the invention to a variety of photocatalytic reactions, such as the synthetic reaction of organic materials and the decomposition reaction of deleterious materials, or reaction affording hydrophilic property, the photocatalyst is irradiated with light of a wavelength which has energy greater than the band gap of the photocatalyst, in the presence of a material to be treated. The photocatalyst can take an arbitrary form depending on the place of utilization. For example, it may be suspended in a solvent, retained or coated on a substrate. Alternatively, it may be in powder form, and such powder may be pulverized or molded.

Examples of deleterious materials which are decomposed or oxidized by photocatalytic reaction by use of titanium oxide and then removed, are materials having adverse effect upon human body and living environment, and materials which might have such adverse effect. For instance, there are a variety of biochemical oxygen demand materials; environmental pollution materials such as air pollution materials; materials of various agricultural chemicals such as herbicide, bactericide, insecticide and nematocide; and microorganism such as bacteria, actinomyces, funguses, algaes and molds. Examples of environmental pollution materials are organic halogen compounds, organic phosphorus compounds, other organic compounds, and inorganic compounds such as nitrogen compounds, sulfur compounds, cyanide and chromium compounds. Examples of organic halogen compounds are polychlorinated biphenyl, fleon, trihalomethanes, trichloroethylene, and tetrachloroethylene. Examples of organic compounds other than organic halogen compounds and organic phosphorous compounds are surface active agents, hydrocarbons such as oils, aldehydes, mercaptans, alcohols, amines, amino acid, and protein. Examples of nitrogen compounds are ammonia and nitrogen oxide.

By utilizing hydrophilic reaction, it is possible to prevent mirrors, glass or spectacle lens from being clouded, and prevent dirt of external walls. This is also applicable to treatment for cancer cells by using an endoscope or the like.

As the light of wavelength having energy greater than band gap, it is preferred to use light containing ultraviolet, for example, solar, fluorescent light, black light, halogen lamp, xenon flash lamp, and mercury lamp. It is greatly preferred to use light containing near-ultraviolet radiation of 300 to 400 nm. Light irradiation amount and time can be suitably set depending upon the amount of a material to be treated.

An example of methods of determining the photocatalytic activity of titanium dioxide is iodine formation test. Specifically, a titanium dioxide powder as a sample is dispersed in an aqueous solution of potassium iodide, and the amount of iodine formed upon irradiation of black light is measured with an absorptiometer. The amount thus obtained is used to determine the photocatalytic activity.

When the photocatalytic activity of a monoclinic titanium dioxide of the invention is determined by the above method, its activity per unit specific surface area is outstanding as compared to conventional titanium oxide photocatalysts. A multifunctional material of the invention is obtained by employing the monoclinic titanium dioxide photocatalyst as described. It is obtainable by incorporating the above photocatalyst in a substrate, by applying a coating composition containing the photocatalyst on a substrate surface so as to form a film, by laminating a film containing the photocatalyst on a substrate surface, or by other arbitrary manners.

Examples of the substrate are pottery, ceramics, metals, glass, plastics, wood, and a complex of these. The substrate can take any form. For instance, it may be of a simple form, such as spherical, cylindrical and tubular substances, plate-like substances, e.g., tile, wall and flooring materials, or of a complicated form, such as a sanitary ware, lavatory sink, bath tub and sink. It is also applicable to curve mirrors, markers, reflectors, tunnel inside strakes, tunnel lighting, external walls, roofs, sashes, mirrors, showcases, refrigerating/freezing showcases, shopwindows, signboards, glass greenhouses, vinyl houses, displays, solar batteries, spectacle glasses, optical lenses, endoscope lenses, paints, and interior materials. The surface of a substrate may be porous or dense.

When the above photocatalyst is incorporated in a substrate, an inorganic binder is used which can be selected from silicate glass, borate glass, phosphate glass, glaze frit for general earthenware, etc. For instance, a photocatalyst of the invention is dispersed in a binder liquid containing $SiO_2$—$Al_2O_3$—$Na_2O/K_2O$ frit, which is allowed to adhere on a substrate such that part of the photocatalyst is exposed from a binder layer. This is heated to melt the binder layer and then cooled to solidify the binder layer, thereby obtaining a multifunctional substrate containing a photocatalyst of the invention.

A coating composition containing a photocatalyst is obtained by mixing a photocatalyst and a binder for coating composition. Suitable binders for coating composition are ones which have resistance to photocatalytic activity. There are, for example, siloxane resin, silicon resin, fluorine-containing resin and silicate glass. Binders having light permeability are more preferable in order that the photocatalyst mixed in a layer is utilized more effectively. In order to prevent from being stained, a binder having water-repellency is preferred, e.g., siloxane resin or fluorine-containing resin.

Coating composition can be applied in a usual manner, for example, spray coating, dip coating, roll coating, or spin coating. In applying a coating composition on a substrate surface such as to form a film, a layer having photocatalytic action may be formed on the entire or part of the substrate surface. A photocatalyst-containing coating composition may be applied directly on a substrate or applied via a primer layer. Particularly, when a substrate is metal or glass, the application via a primer layer is desirable for improving strength of adhesive bonding.

A film containing a photocatalyst is obtained, for example, by the steps of: spraying a mixture of a photocatalyst and a binder to a mold releasing paper such that part of the photocatalyst is exposed from a binder layer; curing or drying; and stripping the mold releasing paper. It should be noted that any other process can be employed. Subsequently, the obtained film is laminated or adhered on the substrate, heated to melt the binder layer, and cooled, thereby obtaining a multifunctional material with the photocatalyst-containing film laminated on the substrate surface.

BEST MODE OF CARRYING OUT THE INVENTION

Figure 1:
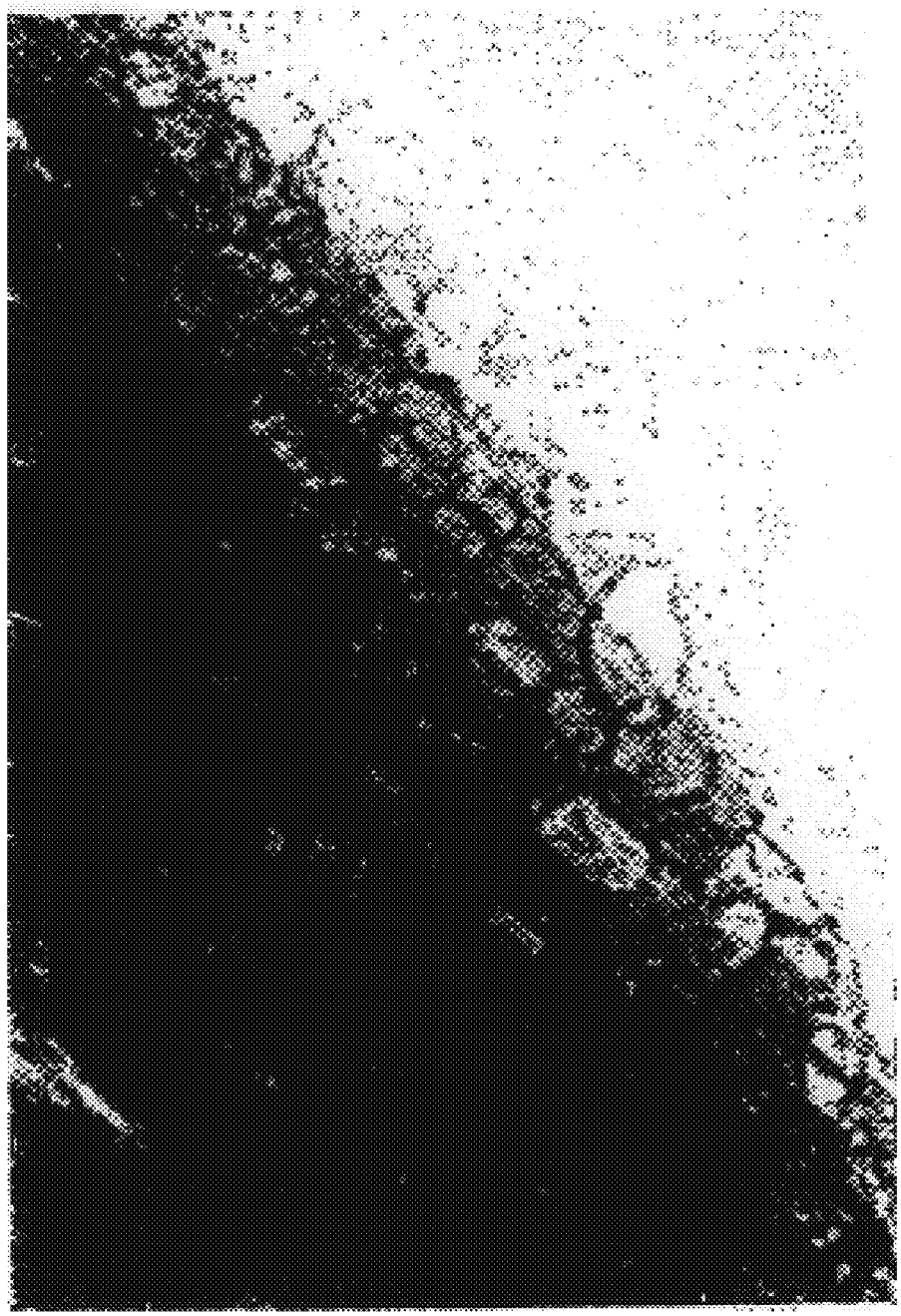
FIG. 1 is a transmission electron microscope (TEM) photograph of a monoclinic titanium dioxide obtained in Example 1.

The invention will be more apparent from the following Examples and Comparative Example.

EXAMPLE 1

Anatase-type titanium dioxide powder (0.7 $\mu$m in mean particle diameter) and a potassium carbonate powder (3 $\mu$m in mean particle diameter) were mixed at a ratio of 4 to 1 (mole ratio), to which $K_2MoO_4$ as a flux was then added and mixed in a ratio of 10 to 80 (mole percent). The obtained mixture (80 g) was placed in a 100-ml platinum crucible and heated at 1100° C. in an electric furnace for four hours to obtain a melt. This was annealed to 900° C. at a rate of 4° C./hour, and then cooled to room temperature (20° C.), to obtain an agglomerate of fibrous crystals.

The agglomerate was finely pulverized in water, washed with water to remove the flux, and then dried. Its weight was measured and found to be 99% yield. After the fibrous crystals were identified by powder X-ray diffraction, it was confirmed that all crystals were $K_2Ti_4O_9$ phase (potassium titanate). The fiber diameter ranged from 0.1 $\mu$m to 1 $\mu$m. The fiber length was 20 $\mu$m average and about 50 $\mu$m maximum.

This potassium titanate fiber was immersed at a rate of 5 g per 100-ml of 1N-nitric acid solution, and $K_2O$ component was extracted while stirring for about three hours, then washed with water, to obtain a titanium dioxide hydrate fiber. This was dried at 200° C. for 10 hours to obtain a fibrous substance. When the fibrous substance was identified by powder X-ray diffraction, all crystals showed $H_2Ti_8O_{17}$ phase and thus confirmed to be a monoclinic 8-titanic acid fiber. By the above extraction of $K_2O$ component, there was formed $H_2Ti_4O_9$ phase which had the skeleton of the original $K_2Ti_4O_9$ (potassium titanate) and was a water-containing phase in which $K^+$ ion was replaced by $H^+$ ion or $H_3O^+$ ion. This $H_2Ti_4O_9$ phase was further dried by heating, to form $H_2Ti_8O_{17}$ phase.

The 8-titanic acid fiber was heated at 550° C. for two hours, to obtain a fibrous substance. By powder X-ray diffraction, the fibrous substance was confirmed to be a titanium dioxide having a monoclinic crystal structure. This had almost the same fiber length, mechanical strength as the $K_2Ti_4O_9$ (potassium titanate) fiber prior to the extraction of $K_2O$ component. FIG. 1 shows its transmission electron microscope (TEM) photograph.

The obtained monoclinic titanium dioxide had a specific surface area of 7 $m^2/g$. This was dispersed in 0.1 mol/l aqueous solution of potassium iodide, and irradiated with black light (ultraviolet intensity: 3 $mW/cm^2$) for 60 minutes. Then, the amount of iodine formed was determined with an absorptiometer, and the amount of iodine per unit specific surface area was 0.197 $mol/m^2$.

EXAMPLE 2

A monoclinic titanium dioxide fiber having a mean fiber length of 7 μm was obtained in the same manner as Example 1 except that the annealing was performed at a rate of 10° C./hour. Its specific surface area was 15 $m^2/g$, and the amount of iodine per unit specific surface area was 0.199 $mol/m^2$.

EXAMPLE 3

The fibrous substance of the monoclinic titanium dioxide of Example 1 was pulverized by a hard ball mill for 36 hours, to obtain a particulate substance. This was then dispersed in ethanol to separate a supernatant liquid and a sedimentation liquid. The particles of these liquids were separated and their specific surface areas were found to be 210 $m^2/g$ and 56 $m^2/g$, respectively. The resulting particulate substances showed 0.212 $mol/m^2$ and 0.195 $mol/m^2$ in the amount of iodine per unit specific surface area, respectively.

Comparative Example 1

For comparison, a similar determination was made by using a commercially available titanium dioxide for photocatalyst (anatase-type, TP-2, Fuji Titanium Industry Co., Ltd.). The amount of iodine per unit specific surface area was 0.076 $mol/m^2$.

EXAMPLE 4

A mixture of 100 parts of tetraethyl orthosilicate, 80 parts of ethyl alcohol, 20 parts of n-propyl alcohol and 5 parts of 0.1N-hydrochloric acid was heated with stirring for 24 hours, to prepare an alcohol solution containing a tetraethyl silicate condensate. To 100 parts of the obtained solution, 20 parts of the monoclinic titanium dioxide fiber of Example 2 were added and mixed to prepare a solution, which was then applied uniformly on an aluminum plate by spray coating. This was heated at 150° C. for 30 minutes, resulting in an aluminum plate having a 20-μm thick coating layer containing a photocatalyst.

EXAMPLE 5

A quantity of 100 parts of tetraethyl orthosilicate, 80 parts of ethyl alcohol, 20 parts of n-propyl alcohol and 5 parts of 0.1N-hydrochloric acid were mixed to obtain a solution. The solution was uniformly applied on a wall sheet composed of polyvinyl chloride by spray coating, followed by drying at 80° C. After drying, a thin film of amorphous silica was formed on the surface of the wall sheet by the hydrolysis and condensation polymerization of the silicate. Subsequently, to 100 parts of the tetraethyl silicate condensate prepared in Example 4, 10 parts of the monoclinic titanium dioxide fiber obtained in Example 1 was added and mixed to obtain a mixture. This mixture was applied on the sheet surface by spray coating, and then heated at 150° C. for 30 minutes, to prepare a wall sheet having a photocatalyst-containing coating layer formed on the binder layer containing the amorphous silica.

EXAMPLE 6

On the surface of an alumina substrate of 100 mm×100 mm×5 mm (alumina: 96%), a binder layer containing 100 parts of "Ethyl silicate 40" (Colcoat Co., Ltd.), and 20 parts of a frit [No. 01-4304, Ferro Enamels (Japan) Ltd.] was formed by spray coating, followed by drying. Thereafter, to 100 parts of the alcohol solution of the tetraethylsilicate condensate prepared in Example 4, 5 parts of the monoclinic titanium dioxide fiber obtained in Example 2 was added and mixed to obtain a mixture. The mixture was uniformly applied on the binder layer by spray coating, to form a 5-μm thick coating layer. The substrate on which the binder layer and the coating layer containing titanium dioxide were laminated was treated in a furnace maintained at 600° C., resulting in an alumina member formed with a photocatalyst layer.

Test Example 1

Samples obtained in Examples 4 to 6 were disposed 8 cm apart from a light source (black light, ultraviolet intensity: 3 $mW/cm^2$) in a closed container, and methyl mercaptan gas was allowed to enter the container such that its initial concentration was 3 ppm. After the irradiation of light for 30 minutes, the decomposition rates of Examples 4, 5 and 6 were found to be 95%, 90% and 85%, respectively, showing that they had photocatalytic effect.

On the other hand, Sample for comparison which was obtained in the same manner as Example 4 except for the use of the commercially available titanium dioxide for photocatalyst (TP-2), had a decomposition rate of 5%.

INDUSTRIAL APPLICABILITY

Thus, the invention provides a novel photocatalyst with higher activity, a process thereof, and a multifunctional material using the same.

What is claimed is:

1. A titanium dioxide photocatalyst having a monoclinic crystal structure;
   wherein said photocatalyst is irradiated with light of a wave length which has energy greater than a band gap of the photocatalyst.

2. A titanium dioxide photocatalyst as defined in claim 1 wherein the lattice constant is expressed by: a=12.163 Å, b=3.735 Å, c=6.513 Å, α=γ=90°, and β=107.29°, and the size of a single crystal is in the range of 0.005 to 0.1 μm.

3. A photocatalyst as defined in claim 1 which is of monoclinic crystal structure and of a titanium dioxide polycrystal.

4. A photocatalyst as defined in claim 1 wherein the specific surface area is in the range of about 1 to 500 $m^2/g$.

5. A multifunctional material containing a photocatalyst of claim 1.

6. A multifunctional material having on a substrate surface a layer containing a photocatalyst of claim 1.

* * * * *